(12) United States Patent
Thiel et al.

(10) Patent No.: US 7,707,868 B2
(45) Date of Patent: May 4, 2010

(54) METHOD FOR DETERMINING THE OPERABILITY OF A PRESSURE SENSOR

(75) Inventors: Christof Thiel, Heilbronn (DE); Andreas Bethmann, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 11/900,447

(22) Filed: Sep. 11, 2007

(65) Prior Publication Data

US 2008/0066522 A1  Mar. 20, 2008

(30) Foreign Application Priority Data

Sep. 15, 2006  (DE) .............. 10 2006 043 320

(51) Int. Cl.
*G01L 27/00* (2006.01)
(52) U.S. Cl. ....................................... 73/1.59
(58) Field of Classification Search ........... 123/90.1, 123/90.15; 73/1.57, 1.59, 1.63, 37, 1.01, 73/118.1, FOR. 116
See application file for complete search history.

(56) References Cited

U.S. PATENT DOCUMENTS

| | | | |
|---|---|---|---|
| 4,228,650 A * | 10/1980 | Camp | 60/39.091 |
| 6,276,319 B2 * | 8/2001 | Walter et al. | 123/90.15 |
| 6,802,209 B2 * | 10/2004 | Joos et al. | 73/114.43 |
| 6,850,833 B1 * | 2/2005 | Wang et al. | 701/108 |
| 6,898,511 B2 * | 5/2005 | Denz et al. | 701/114 |
| 7,133,765 B2 * | 11/2006 | Beyer et al. | 701/114 |
| 7,251,989 B2 * | 8/2007 | Baeuerle | 73/114.37 |
| 2004/0020282 A1 * | 2/2004 | Denz et al. | 73/118.1 |
| 2004/0134256 A1 * | 7/2004 | Herrmann et al. | 73/1.59 |
| 2005/0005912 A1 * | 1/2005 | Joos et al. | 123/458 |

FOREIGN PATENT DOCUMENTS

| | | | | |
|---|---|---|---|---|
| DE | 10021639 C1 * | 1/2002 | | |
| EP | 581151 A1 * | 2/1994 | | 73/FOR. 118 |
| EP | 1327762 A2 * | 7/2003 | | |
| WO | WO 03071111 A1 * | 8/2003 | | |

* cited by examiner

*Primary Examiner*—Thomas P Noland
(74) *Attorney, Agent, or Firm*—Kenyon & Kenyon LLP

(57) ABSTRACT

A method for determining the operability of at least one pressure sensor of an internal combustion engine of a motor vehicle, in which the ambient pressure is first determined by the pressure sensor, and the ambient pressure determined by the pressure sensor is then compared to the ambient pressure determined by a reference pressure sensor not belonging to the internal combustion engine.

11 Claims, 3 Drawing Sheets

METHOD FOR DETERMINING THE OPERABILITY OF A PRESSURE SENSOR

FIELD OF THE INVENTION

The present invention relates to a method for determining the operability of at least one pressure sensor of an internal combustion engine of a motor vehicle.

BACKGROUND INFORMATION

Diagnostic methods meant to detect a malfunction of one or a plurality of pressure sensors are known from the related art. In systems using two pressure sensors the known diagnostic methods may cause the wrong sensor to be detected as faulty so that a properly working pressure sensor will be exchanged. This not only increases the cost for the workshop and the customer, since the vehicle may possibly have to be returned to the workshop a second time, but may also lead to a loss of image.

SUMMARY OF THE INVENTION

To determine the operability of at least one pressure sensor in a flawless manner, the present invention provides that the ambient pressure is first determined with the aid of the pressure sensor, and that the determined ambient pressure is then compared to the ambient pressure determined by a reference pressure sensor which is not part of the internal combustion engine. If the ambient pressure determined by the pressure sensor conforms to the ambient pressure determined by the reference pressure sensor, then the pressure sensor is operative and working well. Of course, this assumes that the reference pressure sensor itself is working perfectly.

If the determined values of the ambient pressure do not agree, the pressure sensor is not operating properly, i.e., is not operative, and must be exchanged. The unambiguous determination of the operability of the pressure sensor prevents the exchange of a functioning pressure sensor.

To this end, the pressure sensor is advantageously situated in such a way that it detects the ambient pressure, i.e., on the outside of the internal combustion engine or on the outside of the housing of the internal combustion engine, for example, or at a suitable location inside the motor vehicle, such as the engine compartment.

In an advantageous manner, the pressure sensor is situated in an intake manifold of the internal combustion engine where it detects the ambient pressure when the internal combustion engine is switched off. During operation of the internal combustion engine, the pressure in the intake manifold would fluctuate and lie below the ambient pressure on average. To enable the pressure sensor disposed in the intake manifold to measure the actual ambient pressure, the internal combustion engine must therefore be switched off. The air in the intake manifold then does not move, and the pressure in the intake manifold corresponds to the ambient pressure.

Specifically, it is provided that the pressure sensor detects a charge pressure of a supercharger, in particular an exhaust-gas turbocharger, during operation of the internal combustion engine, and that it detects an ambient pressure when the internal combustion engine is switched off. The pressure sensor is a charging-pressure sensor, which measures the pressure of the precompressed air during operation of the internal combustion engine.

According to a further development of the present invention, a first pressure sensor is disposed in such a way that it detects the ambient pressure at all times, and a second pressure sensor is situated in the intake manifold of the internal combustion engine and detects the ambient pressure when the internal combustion engine is switched off. The two pressure sensors may be used to adjust the operation of the internal combustion engine to, for instance, a changed environmental air pressure, so that, for example, the internal combustion engine will continue to function properly even at high altitudes.

To check the operability of the pressure sensors, the ambient pressure detected by the first pressure sensor is advantageously compared to the ambient pressure determined by the second pressure sensor. Since the second pressure sensor detects the ambient pressure when the internal combustion engine is switched off, the two pressure sensors—provided they are functioning properly—should determine the same ambient pressure. If the determined ambient pressure of the first pressure sensor deviates from the ascertained ambient pressure of the second pressure sensor by more than the known sensor tolerances, for example, then a malfunction has occurred in one of the pressure sensors.

In order to determine which one of the two pressure sensors is defective, the ambient pressure determined by the first pressure sensor or the ambient pressure determined by the second pressure sensor is advantageously compared to the ambient pressure detected by the reference pressure sensor. If the determined values for the ambient pressure match, then the pressure sensor not taken into account in the comparison is faulty. If, for instance, the ambient pressure determined by the first pressure sensor is compared to the ambient pressure determined by the reference pressure sensor, and if the determined values agree, then it follows that the second pressure sensor is not working properly, due to the fact that one of the two pressure sensors had already been determined to be faulty in the previous step. Thus, it is sufficient here to compare one of the two pressure sensors to the reference pressure sensor to determine the faulty pressure sensor.

According to a further development of the present invention, the ambient pressure determined by the first pressure sensor and the second pressure sensor is compared to the ambient pressure determined by the reference pressure sensor. In this way it can be ensured that not both pressure sensors are operating in a faulty manner. Furthermore, this is an especially simple approach for checking both pressure sensors with regard to their operability since it is not necessary to first compare the ambient pressure determined by the first pressure sensor to the ambient pressure determined by the second pressure sensor. As already mentioned, this of course assumes that the reference pressure sensor is operating properly.

DETAILED DESCRIPTION

Figure 1:
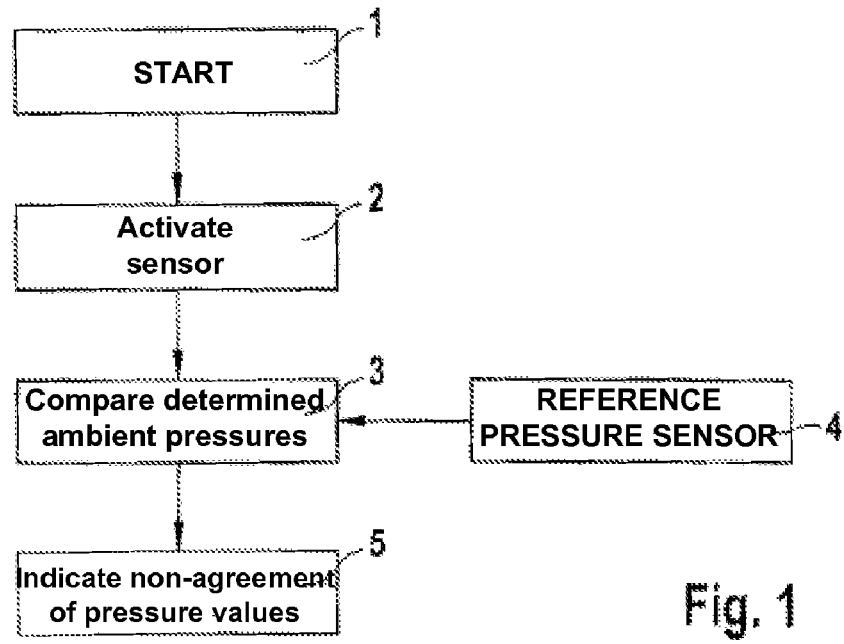
FIG. 1 shows a first exemplary embodiment of the method according to the present invention.

FIG. 1 shows in the form of a flow chart a first exemplary embodiment of the method of the present invention for ascertaining the operability of a pressure sensor of an internal combustion engine, in this first case, an ambient pressure sensor of an internal combustion engine of a motor vehicle. The method is started in a first step 1. In a second step 2, the pressure sensor is activated so that the ambient pressure is determined. In a third step 3, the ambient pressure determined by the pressure sensor in second step 2 is compared to the ambient pressure determined by a reference pressure sensor 4, reference pressure sensor 4 advantageously not being part of the internal combustion engine but instead belonging to an external diagnosis device of a workshop. If the determined ambient pressure values do not agree, then this will be indicated in a fourth step 5, for instance in the form of a warning signal, so that a driver or a mechanic, for instance, will be asked to exchange the defective pressure sensor. The advantage of a mutual comparison of the installed pressure sensors (regardless of a comparison to two or more than two pressure sensors or reference pressure sensors) is that a deviation during operation ("online") is determined, and the driver is able to be informed even without an exact fault localization. The comparison makes it clear that at least one of the pressure sensors/reference pressure sensors is defective. The exact fault localization then takes place in the workshop, for instance, by a comparison to an external pressure sensor. The external pressure sensor has, in particular, a smaller sensor tolerance than the pressure sensors/reference pressure sensors installed in the motor vehicle.

Figure 2:
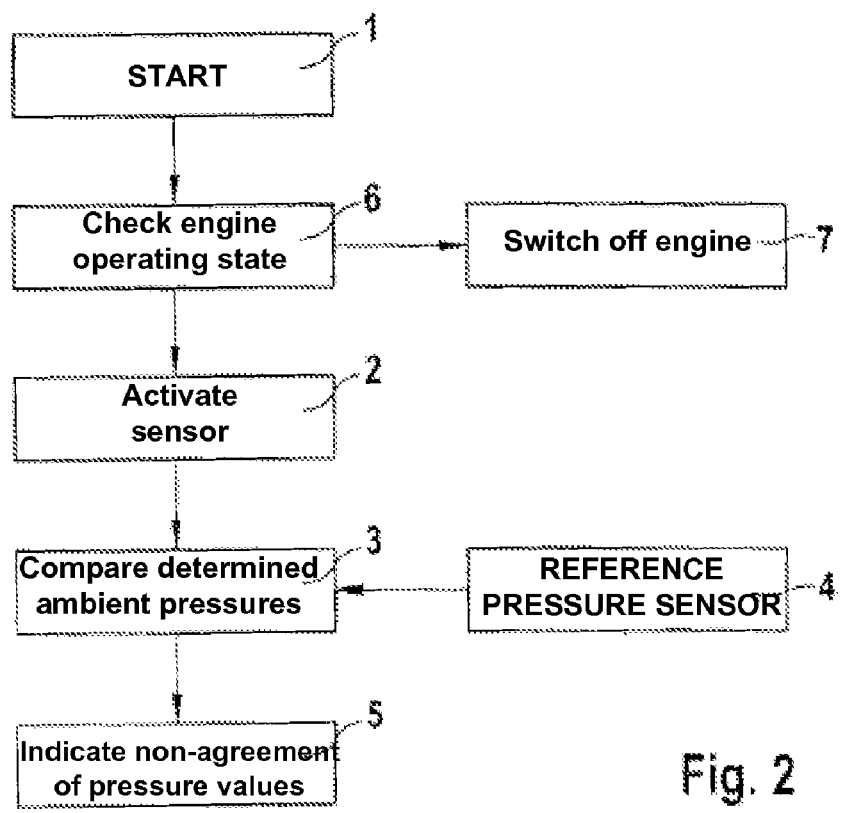
FIG. 2 shows a second exemplary embodiment.

FIG. 2 shows a second exemplary embodiment, which represents a broadening of the first exemplary embodiment. The pressure sensor under discussion here is installed in an intake manifold of the internal combustion engine. After starting the method in first step 1, the operating state of the internal combustion engine is first checked in an intermediate step 6. If the internal combustion engine is running, then it is first switched off in an additional intermediate step 7, so that the ambient pressure comes about in the intake manifold in which the pressure sensor is located. Only then will the pressure sensor be activated in the following step 2 and checked for operability in the same manner as in the first exemplary embodiment.

Figure 3:
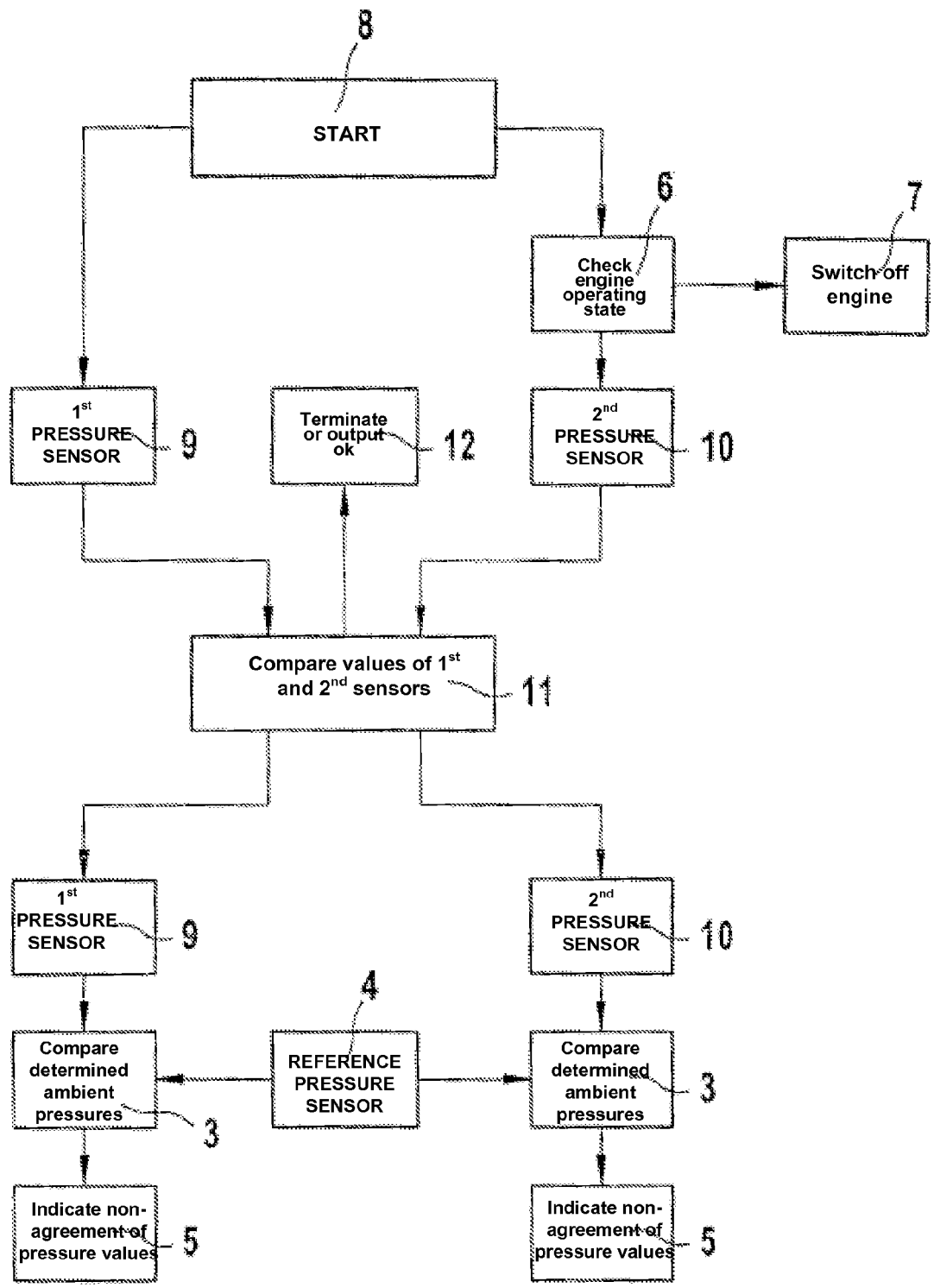
FIG. 3 shows a third exemplary embodiment.

FIG. 3 shows a third exemplary embodiment of the invention, once again in the form of a flow chart. The third exemplary embodiment illustrates the advantageous method for determining the operability of a pressure sensor in the case of a device having two pressure sensors, a first pressure sensor 9 being situated in such a way that it detects the ambient pressure, and a second pressure sensor 10 being situated in an intake manifold of the internal combustion engine. After starting the method in first step 8, both pressure sensors 9 and 10 are activated; prior to activating pressure sensor 10, which is disposed in the intake manifold, the operating state of the internal combustion engine is checked with the aid of intermediate steps 6 and 7 known from the second exemplary embodiment, and the internal combustion engine is switched off, if appropriate. The values determined by pressure sensors 9 and 10 are compared to one another in the following step 11. If the ascertained values for the ambient pressure including tolerances are in agreement, then the method is terminated and/or an "okay" report 12 (a report that pressure sensors 9, 10 are functioning properly) is output. It may be assumed in this case that pressure sensors 9 and 10 are operating without a fault. However, if the determined values do not agree, then both pressure sensors will be checked for operability, as described in the first exemplary embodiment, the ambient pressure determined by pressure sensor 9 and the ambient pressure determined by pressure sensor 10 being compared to an ambient pressure 4 determined by a reference pressure sensor. In an advantageous manner, only one of pressure sensors 9 or 10 is compared to reference value 4 since this already provides information about the operability of the two pressure sensors 9 and 10 inasmuch as, if an ambient pressure of one of the two pressure sensors 9 or 10 agrees with the ambient pressure determined by the reference pressure sensor, the other pressure sensor 10 or 9 is the faulty sensor.

Figure 4:
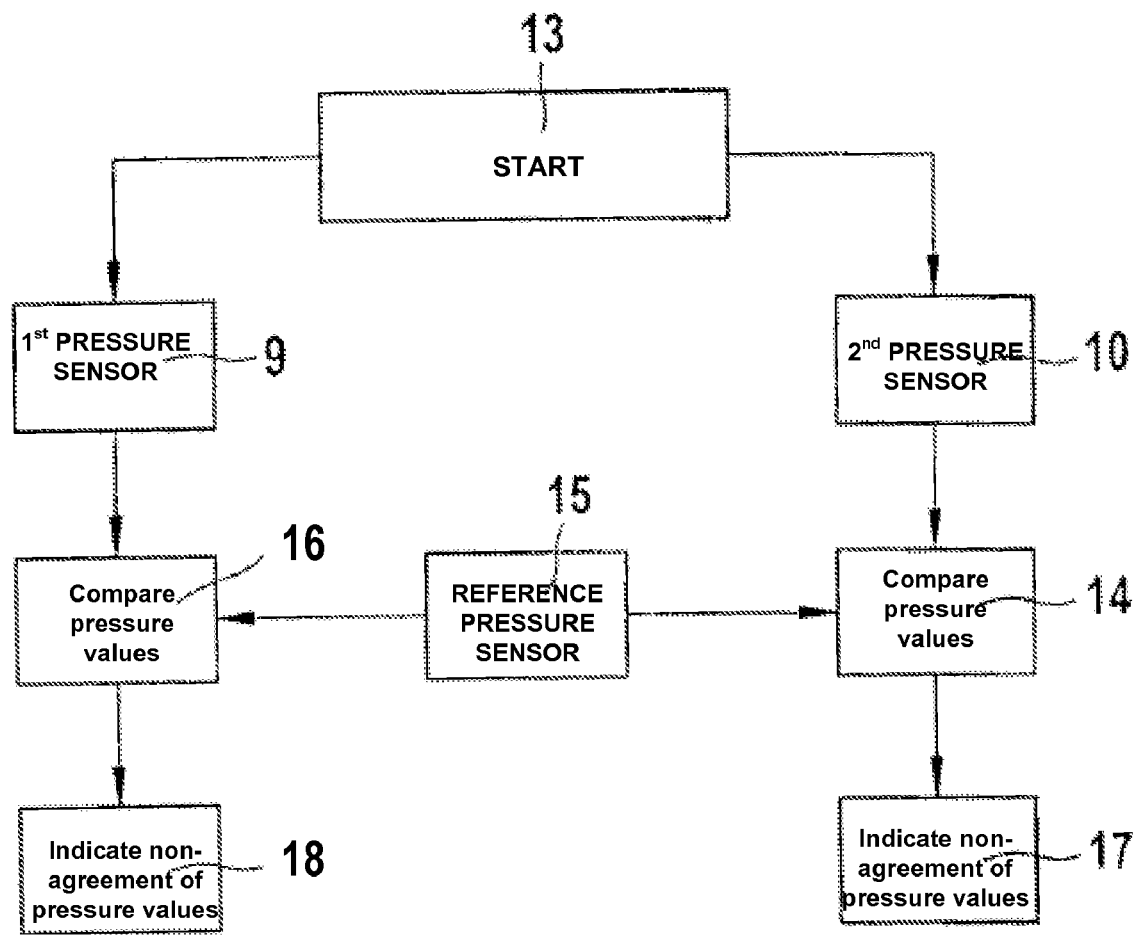
FIG. 4 shows a fourth exemplary embodiment.

FIG. 4 shows a fourth exemplary embodiment of the present invention. As in the previous exemplary embodiment, the two pressure sensors 9 and 10 are examined here. After staffing the method in a first step 13, both pressure sensors 9 and 10 are activated and thus determine the particular ambient pressure; for an advantageous measurement, the operating state of the internal combustion engine is first checked as described in the second and third exemplary embodiments, so that the internal combustion engine will be switched off, if appropriate. Subsequently, the ambient pressure determined by pressure sensor 9 and pressure sensor 10 is compared, at steps 14 and 16, to an ambient pressure determined by a reference-pressure sensor 15. If one of the determined values for the ambient pressure does not agree with reference ambient pressure 15, then this will be indicated in following step 17 and/or 18. This method allows an especially simple determination of the operability of both pressure sensors 9 and 10, and it is also possible, of course, to check an even greater number of pressure sensors with regard to their operability. The direct comparison to the reference ambient pressure dispenses with a comparison of the determined ambient pressure of pressure sensor 9 and pressure sensor 10, so that the method becomes even simpler.

In principle, this method also makes it possible to check a pressure sensor which measures a charging pressure of a supercharged internal combustion engine. A prerequisite is that the pressure sensor (charging-pressure sensor) measures an ambient pressure when the internal combustion engine is switched off.

All methods require that the sensor tolerances be taken into account in order to avoid the replacement of pressure sensors or reference-pressure sensors that are functional according to their specification.

What is claimed is:

1. A method for determining an operability of at least one pressure sensor of an internal combustion engine of a motor vehicle, comprising
   using a first of the at least one pressure sensor to detect a charge pressure of an exhaust-gas turbocharger during operation of the internal combustion engine;
   using the first pressure sensor to detect an ambient pressure when the internal combustion engine is switched off, the detection of the ambient pressure including determining a first ambient pressure value;
   comparing the first ambient pressure value to a second ambient pressure value determined by a reference pressure sensor not belonging to the internal combustion engine; and
   determining a fault in the at least one pressure sensor in response to detection in the comparing step of a difference between the first and second ambient pressure values.

2. The method according to claim 1, wherein the first pressure sensor is situated in such a way that it detects the ambient pressure.

3. The method according to claim 1, wherein the first pressure sensor is situated in an intake manifold of the internal combustion engine.

4. The method according to claim 1, wherein a second of the at least one pressure sensor is situated in such a way that it detects the ambient pressure at all times, and the first pressure sensor is situated in an intake manifold of the internal combustion engine.

5. The method according to claim 4, wherein the second pressure sensor is situated on an outside of the internal combustion engine.

6. The method according to claim 4, wherein the second pressure sensor is situated on an outside of a housing of the internal combustion engine.

7. A method for determining an operability of at least one pressure sensor of an internal combustion engine of a motor vehicle, comprising:
   using a first of the at least one pressure sensor to detect a charge pressure of an exhaust-gas turbocharger during operation of the internal combustion engine;
   using the first pressure sensor to detect an ambient pressure when the internal combustion engine is switched off, the detection of the ambient pressure including determining a first ambient pressure value, wherein a second of the at least one pressure sensor is situated in such a way that it detects the ambient pressure at all times, and the first pressure sensor is situated in an intake manifold of the internal combustion engine;
   in a first comparing step, comparing the first ambient pressure value to a second ambient pressure value determined by the second pressure sensor;
   in a second comparing step, comparing at least one of the first ambient pressure value and the second ambient pressure value to a third ambient pressure value determined by a reference pressure sensor not belonging to the internal combustion engine; and
   identifying a fault in the at least one pressure sensor in response to detection in the second comparing step of a difference between the at least one of the first and second ambient pressure values and the third ambient pressure value.

8. The method according to claim 7, wherein only one of the first and second ambient pressure values is compared to the third ambient pressure value in the second comparing step.

9. The method of claim 7, wherein the identifying the fault is based on the first comparing step.

10. The method of claim 7, wherein the second comparing step and the fault identification are performed conditional upon determining a difference between the first and second ambient pressure values in the first comparing step.

11. A method for determining an operability of at least one pressure sensor of an internal combustion engine of a motor vehicle, comprising
   using a first of the at least one pressure sensor to detect a charge pressure of an exhaust-gas turbocharger during operation of the internal combustion engine;
   using the first pressure sensor to detect an ambient pressure when the internal combustion engine is switched off, the detection of the ambient pressure including determining a first ambient pressure value, wherein a second of the at least one pressure sensor is situated in such a way that it detects the ambient pressure at all times, and the first pressure sensor is situated in an intake manifold of the internal combustion engine;
   comparing the first ambient pressure value and the second ambient pressure value to a third ambient pressure value determined by a reference pressure sensor not belonging to the internal combustion engine; and
   identifying a fault in the at least one pressure sensor in response to detection in the second comparing step of a difference between at least one of the first and second ambient pressure values and the third ambient pressure value.

* * * * *